United States Patent
Tsuda

(10) Patent No.: US 10,401,663 B2
(45) Date of Patent: Sep. 3, 2019

(54) CURVED LIQUID CRYSTAL DISPLAY AND METHOD OF MANUFACTURING THE SAME

(71) Applicant: Panasonic Liquid Crystal Display Co., Ltd., Himeji-shi, Hyogo (JP)

(72) Inventor: Kazuhiko Tsuda, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 41 days.

(21) Appl. No.: 15/476,301

(22) Filed: Mar. 31, 2017

(65) Prior Publication Data

US 2018/0284522 A1    Oct. 4, 2018

(51) Int. Cl.
G02F 1/1333    (2006.01)

(52) U.S. Cl.
CPC ............... G02F 1/133305 (2013.01); *G02F 2001/133302* (2013.01); *G02F 2001/133368* (2013.01)

(58) Field of Classification Search
CPC ......... G02F 1/133305; G02F 1/133514; G02F 1/134309; G02F 1/133528; G02F 1/1368; G02F 1/133516; G02F 2001/133302; G02F 2201/121; G02F 2201/123; G02F 2201/56; G02F 1/1333; G02F 1/136277; G02F 2001/133368; G02F 2001/133354; H01L 27/12; H01L 27/1203; H01L 27/1218; H01L 21/02367
USPC ........................................................ 349/158
See application file for complete search history.

(56) References Cited

U.S. PATENT DOCUMENTS

| | | | |
|---|---|---|---|
| 6,738,111 B2 | 5/2004 | Kawata | |
| 2002/0047952 A1 | 4/2002 | Kawata | |
| 2005/0094071 A1* | 5/2005 | Akiyama | G02F 1/133305 349/122 |
| 2012/0020056 A1* | 1/2012 | Yamagata | G02F 1/133308 362/97.1 |
| 2012/0168058 A1* | 7/2012 | Kim | B29D 11/0073 156/101 |
| 2012/0168788 A1* | 7/2012 | Moriya | G02F 1/133603 257/89 |
| 2013/0278873 A1* | 10/2013 | Enomoto | G02F 1/133536 349/96 |
| 2014/0226112 A1* | 8/2014 | Kim | G02F 1/133305 349/96 |
| 2014/0274655 A1* | 9/2014 | Yu | C03C 3/093 501/67 |

(Continued)

*Primary Examiner* — Shan Liu
(74) *Attorney, Agent, or Firm* — Hamre, Schumann, Mueller & Larson, P.C.

(57) ABSTRACT

A curved LCD and method of manufacturing the same are disclosed. The curved LCD includes a curved LCD panel having first and second substrates. A major surface of the first substrate faces a major surface of the second substrate. A liquid crystal layer is disposed between the major surface of the first substrate and the major surface of the second substrate. A third substrate is made of a glass or a synthetic resin and is curved in geometry. A fourth substrate made of glass is curved in geometry. The LCD panel is secured to the third and fourth substrates between a major surface of the third substrate and a major surface of the fourth substrate. The fourth substrate and the LCD panel are positioned on a concave side of a curve of the fourth substrate. The third substrate is relatively thicker than the fourth substrate.

5 Claims, 5 Drawing Sheets

(56) References Cited

U.S. PATENT DOCUMENTS

2018/0188590 A1* 7/2018 Gu .................... G02F 1/133504

* cited by examiner

CURVED LIQUID CRYSTAL DISPLAY AND METHOD OF MANUFACTURING THE SAME

FIELD

This disclosure relates generally to an electronic display and a method of manufacturing an electronic display. More specifically, this disclosure relates to a curved electronic display such as, but not limited to, a curved liquid crystal display and a method of manufacturing the curved liquid crystal display.

BACKGROUND

A liquid crystal display (LCD) device is an electronic display device that is widely used as a display device for electronic devices such as computers, televisions, cellular phones, and the like. LCDs generally include a thin film transistor (TFT) substrate and a color filter substrate. A liquid crystal layer is disposed between the TFT substrate and the color filter substrate.

SUMMARY

This disclosure relates generally to an electronic display and a method of manufacturing an electronic display. More specifically, this disclosure relates to a curved electronic display such as, but not limited to, a curved liquid crystal display (LCD) and a method of manufacturing the curved LCD.

In an embodiment, the LCD includes an in-plane switching (IPS) mode LCD.

In an embodiment, the LCD includes a curved geometry.

In an embodiment, the LCD can be included as a display device for an electronic device such as, but not limited to, a display for a laptop computer, a display for a tablet computer, a display for a desktop computer, a television, or the like. In an embodiment, the LCD is included as a display for an electronic device such as, but not limited to, a display for a wearable device. In an embodiment, the wearable device includes an arm-wearable device such as, but not limited to, a watch, a smartwatch, or the like. In an embodiment, the wearable device includes a head wearable device, or the like.

In an embodiment, a non-curved LCD panel can be secured to a non-curved thin, transparent, toughened glass. The combination of the LCD panel and the glass can be bent to form a curved LCD panel and glass combination. The resulting curved structure can be designed to match a curve of a curved glass substrate that is relatively thicker than the thin, transparent, toughened glass. The resulting curved structure can be secured to the curved glass substrate.

In an embodiment, the toughened glass can have a different structure than the curved glass substrate. In an embodiment, the toughened glass can include a relatively higher concentration of potassium than the curved glass substrate.

A curved liquid crystal display is disclosed. The curved liquid crystal display includes a curved liquid crystal display panel that includes first and second substrates. A major surface of the first substrate faces a major surface of the second substrate. A liquid crystal layer is disposed between the major surface of the first substrate and the major surface of the second substrate. The curved liquid crystal display includes a third substrate made of one of a glass or a synthetic resin and that is curved in geometry. The curved liquid crystal display includes a fourth substrate made of glass that is curved in geometry. The liquid crystal display panel is secured to the third and fourth substrates. The liquid crystal display panel is disposed between a major surface of the third substrate and a major surface of the fourth substrate. The fourth substrate and the liquid crystal display panel are positioned on a concave side of a curve of the fourth substrate. The third substrate is relatively thicker than the fourth substrate.

A curved liquid crystal display is disclosed. The curved liquid crystal display includes a curved liquid crystal display panel that includes a first substrate made of plastic and a plurality of thin film transistors formed thereon; a second substrate made of glass and a plurality of color filter layers formed thereon; and a liquid crystal layer disposed between the first substrate and the second substrate. The curved liquid crystal display further includes a third substrate made of one of a glass and a synthetic resin. The third substrate is curved such that a curve is formed having a convex side and a concave side. The liquid crystal display panel is secured to the third substrate and is oriented such that the first substrate is disposed on the convex side of the third substrate.

A method of manufacturing a curved liquid crystal display is disclosed. The method includes forming a liquid crystal display panel by securing a liquid crystal layer between first and second substrates, wherein one or more of the first and second substrates are plastic; securing the liquid crystal display panel to a third substrate that is flat; bending the liquid crystal display panel and third substrate, wherein the bending is performed such that the third substrate is disposed on a concave side of the curve; securing the liquid crystal display panel and third substrate to a fourth substrate, the fourth substrate having a curved shape, the liquid crystal display panel being disposed between the third and fourth substrates.

A method of manufacturing a curved liquid crystal display is disclosed. The method includes forming a plurality of thin film transistors on a first substrate that is made of plastic; forming a plurality of color filters on a second substrate that is made of a glass; forming a liquid crystal display panel by securing a liquid crystal layer between the first and second substrates; bending the liquid crystal display panel, the bending being performed such that the second substrate is disposed on a concave side of a curve; providing a third substrate having a curved shape and made of glass or synthetic resin; and securing the third substrate to the liquid crystal display panel, such that the first substrate is disposed between the second and third substrates.

BRIEF DESCRIPTION OF THE DRAWINGS

References are made to the accompanying drawings that form a part of this disclosure, and that illustrate embodiments in which systems and methods described in this specification can be practiced.

Like reference numbers represent like parts throughout.

DETAILED DESCRIPTION

This disclosure relates generally to an electronic display and a method of manufacturing an electronic display. More specifically, this disclosure relates to a curved electronic display such as, but not limited to, a curved liquid crystal display (LCD) and a method of manufacturing the curved LCD.

An LCD panel can be designed to be flexible. A flexible LCD panel may generally be referred to as a film LCD or the like. The flexibility of the LCD display panel can, for example, be a design consideration when the LCD panel is used as a display for an electronic device with a curved display. For example, wearable devices (e.g., an arm-wearable device such as, but not limited to, a watch, a smartwatch, or the like) may have a curved display. Unevenness (e.g., a wave, a wrinkle, or the like) can be formed on a surface of the flexible LCD panel when forming the curved display. Unevenness of the LCD panel can result in a lower quality LCD panel than an LCD panel that does not include the unevenness.

In an embodiment, a thin, transparent, toughened glass can be secured to a flexible LCD panel. A combination of the toughened glass and flexible LCD panel can be bent to form a curved LCD panel, and the combination can be attached to a relatively thicker curved glass or synthetic resin. In an embodiment, a resulting LCD can have a reduced unevenness of the LCD panel relative to prior flexible LCD panels.

A toughened glass, as used in this specification, generally refers to a glass substrate which has been chemically strengthened. A suitable example of a toughened glass is Gorilla® Glass, which is commercially available from Corning Incorporated. Because the toughened glass contains relatively more potassium atoms than a normal alkaline glass, the toughened glass is generally more resilient to scratching or cracking than the normal alkaline glass. The toughened glass may also be curved relatively more than the normal alkaline glass before breaking.

The figures, which will be described in additional detail below, include various hatching. The hatching is not intended to limit to a particular material, but is used for simplicity in viewing the figures.

Figure 1A:
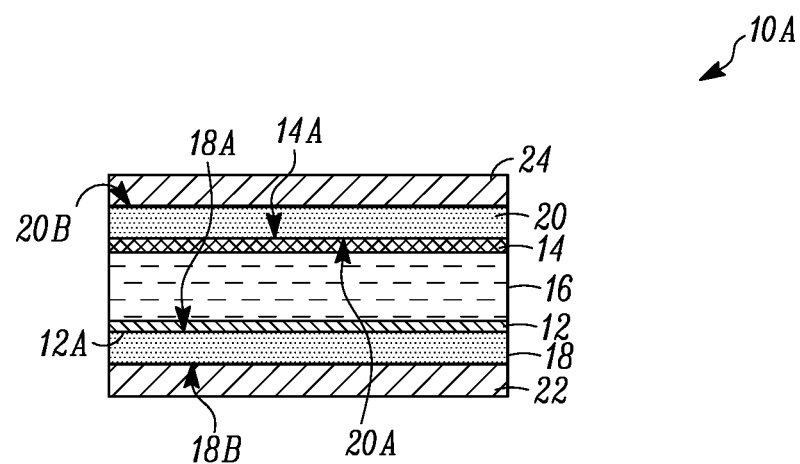
FIGS. 1A and 1B illustrate liquid crystal display (LCD) panels, according to an embodiment.
Figure 1B:
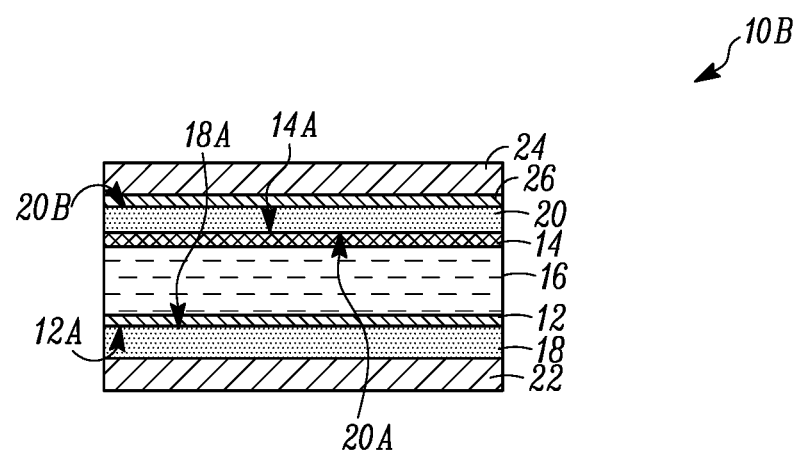

FIGS. 1A and 1B illustrate LCD panels 10A and 10B, according to an embodiment. Reference will be made generally to FIGS. 1A and 1B, with some specific references being made to individual figures as well. The LCD panels 10A and 10B can be referred to as a film LCD or the like.

The LCD panels 10A and 10B include a thin film transistor (TFT) layer 12 and a color filter layer 14. The TFT layer 12 can include data lines, gate lines, source and drain electrodes, a semiconductor layer, pixel electrodes, or the like. The color filter layer 14 can include color filters, a black matrix, overcoat layers, or the like.

A liquid crystal (liquid crystal layer 16) is held between the TFT layer 12 and the color filter layer 14. In an embodiment, the liquid crystal layer 16 can have a thickness from at or about 2.5 μm to at or about 3.0 μm. A thin film transistor (TFT) substrate 18 is disposed on a major surface 12A of the TFT layer 12 that faces away from the liquid crystal layer 16. In an embodiment, the TFT substrate 18 can have a thickness from at or about 10 μm to at or about 20 μm. A color filter substrate 20 is disposed on a major surface 14A of the color filter layer 14 that faces away from the liquid crystal layer 16. In an embodiment, the color filter substrate 20 can have a thickness from at or about 10 μm to at or about 20 μm. A major surface 18A of the TFT substrate 18 is disposed facing a major surface 20A of the color filter substrate 20. The TFT substrate 18 and the color filter substrate 20 can sandwich the TFT layer 12, the color filter layer 14, and the liquid crystal layer 16 therebetween. In an embodiment, the TFT substrate 18 is made of plastic such as, but not limited to, polyimide. In an embodiment, the color filter substrate 20 is made of plastic such as, but not limited to, polyimide. In an embodiment, the substrates 18, 20 can be the same as or substantially similar to each other subject to, for example, manufacturing tolerances or the like.

A polarizer 22 may be disposed on a major surface 18B of the TFT substrate 18. A polarizer 24 may be disposed on a major surface 20B of the color filter substrate 20. In an embodiment, the polarizers 22, 24 can be the same as or substantially similar to each other, subject to, for example, manufacturing tolerances or the like. The polarizers 22, 24 can have thicknesses from at or about 100 μm to at or about 300 μm.

The LCD panel 10A (FIG. 1A) can be driven by any mode. Examples of suitable driving modes include, but are not limited to, an in-plane switching (IPS) mode, a twisted nematic (TN) mode, or vertical alignment (VA) mode.

In FIG. 1B, the LCD panel 10B is an IPS mode LCD panel, according to an embodiment. In the illustrated embodiment, in addition to the features described above, an indium-tin-oxide (ITO) layer 26 is formed between the color filter substrate 20 and the polarizer 24. The ITO layer 26 connects to a ground level to prevent the color filter substrate 20 from becoming electrostatically charged, which may interfere with an electric field between a pixel electrode and a common electrode.

Figure 2:
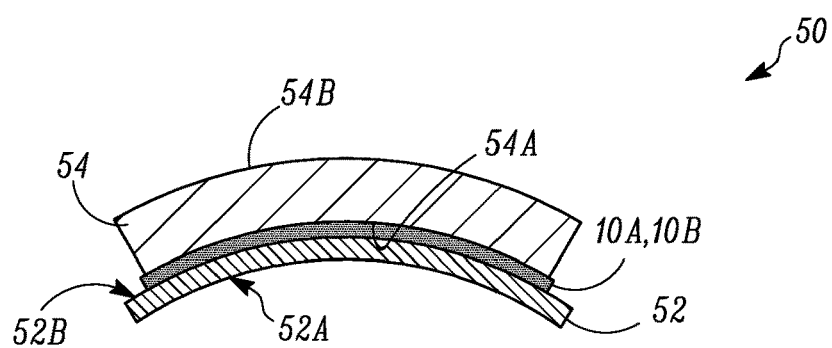
FIG. 2 illustrates a curved LCD, according to an embodiment.

FIG. 2 illustrates a curved LCD 50, according to an embodiment. The LCD 50 includes one of the LCD panels 10A, 10B (FIGS. 1A, 1B). In the LCD 50, the LCD panel 10A or 10B is disposed between an auxiliary substrate 52 and a cover substrate 54. The auxiliary substrate 52 can be made of a glass substrate. The cover substrate 54 can be made of a glass or a synthetic resin. In an embodiment, the auxiliary substrate 52 can be a thin, transparent, toughened glass substrate. As a result, the auxiliary substrate 52 can have a relatively higher concentration of potassium than the cover substrate 54. The cover substrate 54 can be less resilient to scratching and cracking than the auxiliary substrate 52. The cover substrate 54 can have less flexural strength than the auxiliary substrate 52.

The auxiliary substrate 52 has major surfaces 52A and 52B. Major surface 52A faces a concave side of the LCD 50 and the major surface 52B faces the LCD panel 10A or 10B. The cover substrate 54 has major surfaces 54A and 54B. The major surface 54A faces the LCD panel 10A or 10B and the major surface 54B a convex side of the LCD 50. The major surface 52B of the auxiliary substrate 52 is oriented facing the major surface 54A of the cover substrate 54. The cover substrate 54 can be curved prior to being secured to the LCD panel 10A or 10B. In other words, the cover substrate 54 is formed into a curved shape. The auxiliary substrate 52 and LCD panel 10A or 10B are secured to the cover substrate 54 on a concave side of the curved cover substrate 54 such that the LCD panel 10A or 10B is disposed on a side of the cover substrate 54 corresponding to the major surface 54A.

In an embodiment, a thickness of the auxiliary substrate 52 can be from at or about 100 μm to at or about 300 μm. In an embodiment, the cover substrate 54 can be from at or about 500 μm to at or about 2,000 μm and is relatively thicker than the auxiliary substrate 52.

In an embodiment, the LCD panel 10A or 10B can be secured to the auxiliary substrate 52 prior to being secured to the cover substrate 54. During manufacturing, the LCD panel 10A or 10B and the auxiliary substrate 52 may be in a non-curved (e.g., flat or substantially flat) state at a time of securing the LCD panel 10A or 10B to the auxiliary substrate 52. An adhesive, or adhesive layer (not shown), may be disposed between the LCD panel 10 and the auxiliary substrate 52 to facilitate securing the LCD panel 10A or 10B and the auxiliary substrate 52 together. The combination of the LCD panel 10A or 10B and the auxiliary substrate 52 can then be formed into a curved geometry that corresponds to the curved geometry of the cover substrate 54. Bending the combination of the LCD panel 10A or 10B and the auxiliary substrate 52 can induce a tensile stress on the LCD panel 10A or 10B and a compressive stress on the auxiliary substrate 52. The tensile stress on the LCD panel 10A or 10B can reduce and/or prevent wrinkling/unevenness of the LCD panel 10A or 10B. In an embodiment, this can increase a quality of the display of the LCD 50. A method of manufacturing is shown and described in accordance with FIG. 5 below.

In the illustrated embodiment, the polarizer 22, 24 of the LCD panel 10A or 10B is arranged between the auxiliary substrate 52 and the cover substrate 54. It will be appreciated that this is an example and that the placement can vary. For example, the polarizer 22, 24 may be disposed on the major surface 54B of the cover substrate 54 or the major surface 52A of the auxiliary substrate 52.

FIGS. 3A, 3B, 3C, 3D and 3E illustrate LCDs 100A, 100B, and 100C, according to an embodiment. Features of the LCDs 100A, 100B can be the same as or similar to features of the LCD 50 in FIG. 2.

In addition to the structure of the LCD 50 in FIG. 2, the LCDs 100A, 100B include an indium-tin-oxide (ITO) layer 102. The LCDs 100A and 100B are representative of an IPS mode device. In the embodiment in FIG. 3A, the ITO layer 102 is disposed on the major surface 52A of the auxiliary substrate 52. FIG. 3B shows the LCD 100A in a non-curved state for illustrative purposes. As shown in FIG. 3B, the color filter substrate 20 is arranged between the liquid crystal layer 16 and the auxiliary substrate 52. In FIG. 3C, the ITO layer 102 is disposed on the major surface 54B of the cover substrate 54. FIG. 3D illustrates the LCD 100B in a non-curved state for illustrative purposes. As shown in FIG. 3D, the color filter substrate 20 is arranged between the liquid crystal layer 16 and the cover substrate 54. In the illustrated embodiment, the ITO layer 102 connects to a ground level.

Figure 3A:
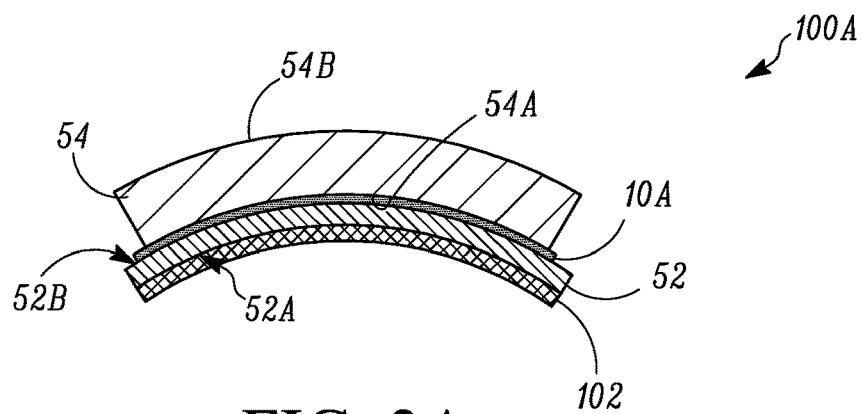
FIGS. 3A-3E illustrate LCDs, according to an embodiment.
Figure 3B:
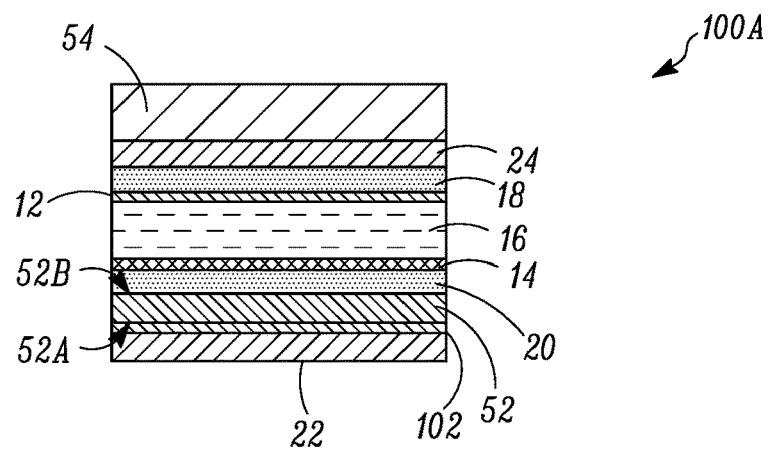
Figure 3C:
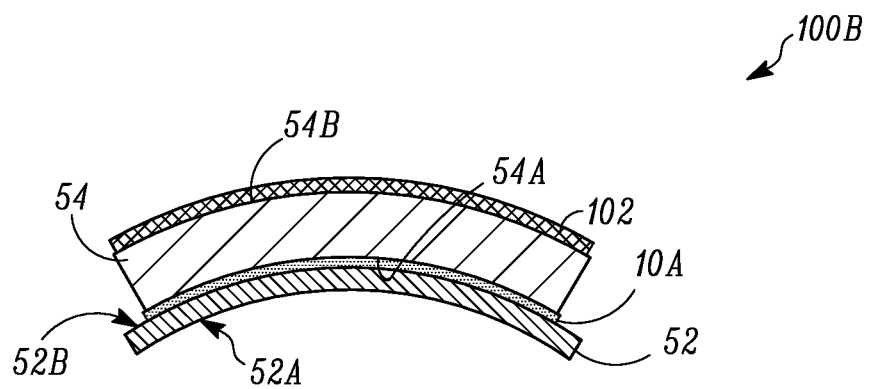
Figure 3D:
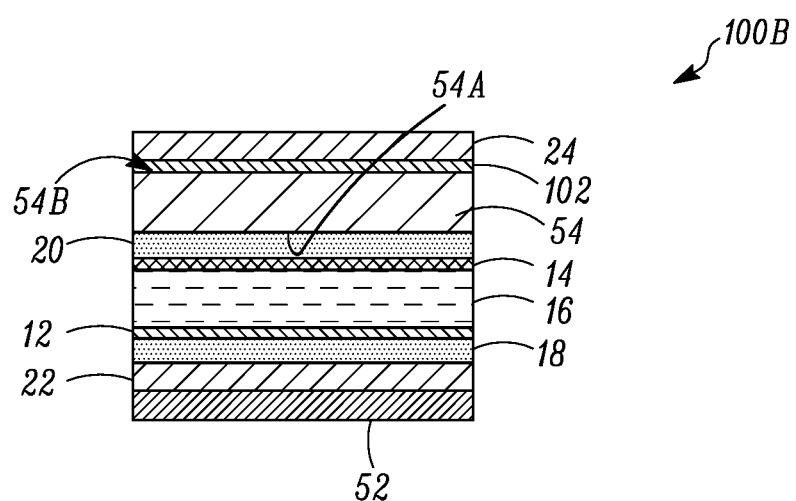
Figure 3E:
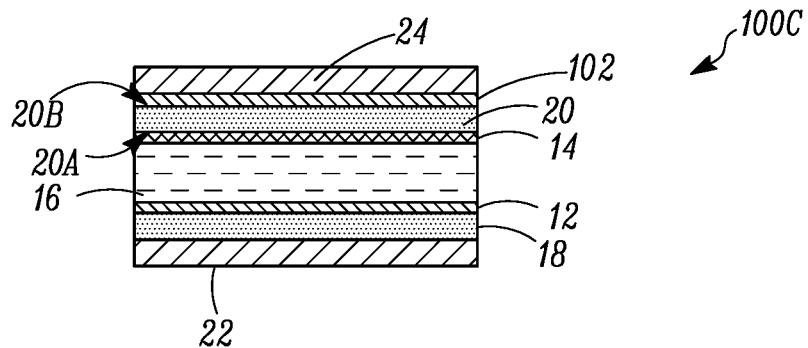

FIG. 3E illustrates a comparative LCD 100C in a non-curved state for illustrative purposes. In the comparative LCD 100C, the ITO layer 102 is disposed on the major surface 20B of the color filter substrate 20. In such a case, the ground potential of the ITO layer 102 may affect the electric field between a pixel electrode and a common electrode included in the TFT layer 12, because the color filter substrate 20 is so thin that this electric field may interact with the ground potential of the ITO layer 102.

Placement of the ITO layer 102 in FIGS. 3A and 3C may prevent the interaction from the comparative example in FIG. 3E. The auxiliary substrate 52 or the cover substrate 54 can expand a distance between this electric field and the ground potential of the ITO layer 102. In an embodiment, such placement can, for example, prevent static electricity on the color filter substrate 20 from impacting an image displayed by the LCDs 100A, 100B.

Figure 4A:
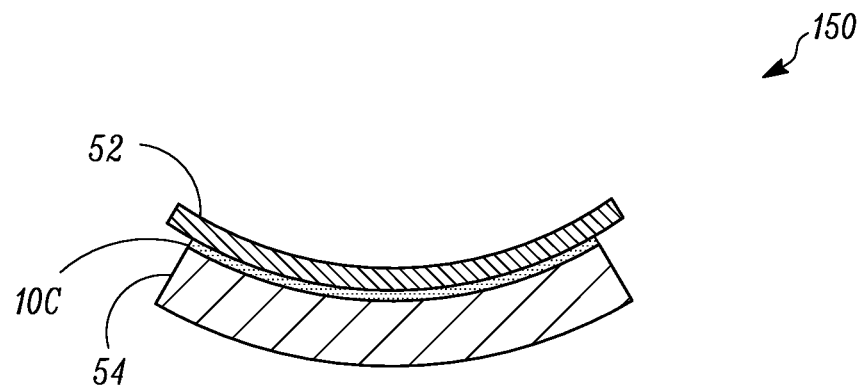
FIGS. 4A and 4B illustrate an LCD, according to an embodiment.

FIG. 4A illustrates a curved LCD 150, according to an embodiment. Features of the LCD 150 can be the same as or similar to features of the LCD 50 in FIG. 2 and/or the LCDs 100A or 100B in FIGS. 3A and 3B. The LCD 150 includes an LCD panel 10C as shown and described in accordance with FIG. 4B.

The LCD panel 10C is similar to the LCD panel 10B of FIG. 1. In the embodiment included in FIGS. 4A and 4B, the LCD panel 10C utilizes the auxiliary substrate 52 in place of the color filter substrate 20. In an embodiment, the LCD 150 can be relatively cheaper to manufacture than an embodiment including the LCD panel 10B because of reducing a number of components of the LCD panel 10C by substituting the auxiliary substrate 52 for the color filter substrate 20.

Figure 4B:
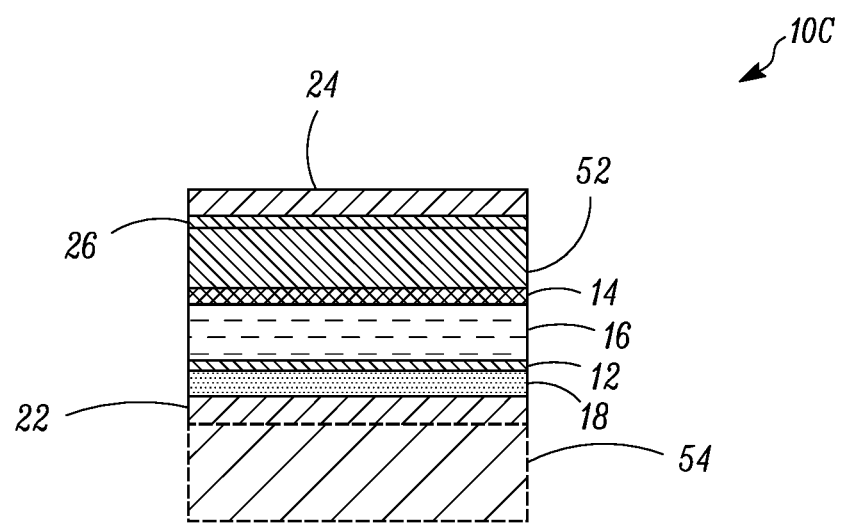

In FIG. 4B, the substrate LCD 150 is shown in a non-curved state for illustrative purposes. In the non-curved state, the cover substrate 54 is shown in dashed lines to illustrate its location relative to the polarizer 22 in a curved state (as shown in FIG. 4B). The cover substrate 54 is shown in dashed lines since it has a curved geometry and would not be secured to the LCD panel 10C until after the LCD panel 10C and auxiliary substrate 52 were bent to a curved state.

Figure 5:
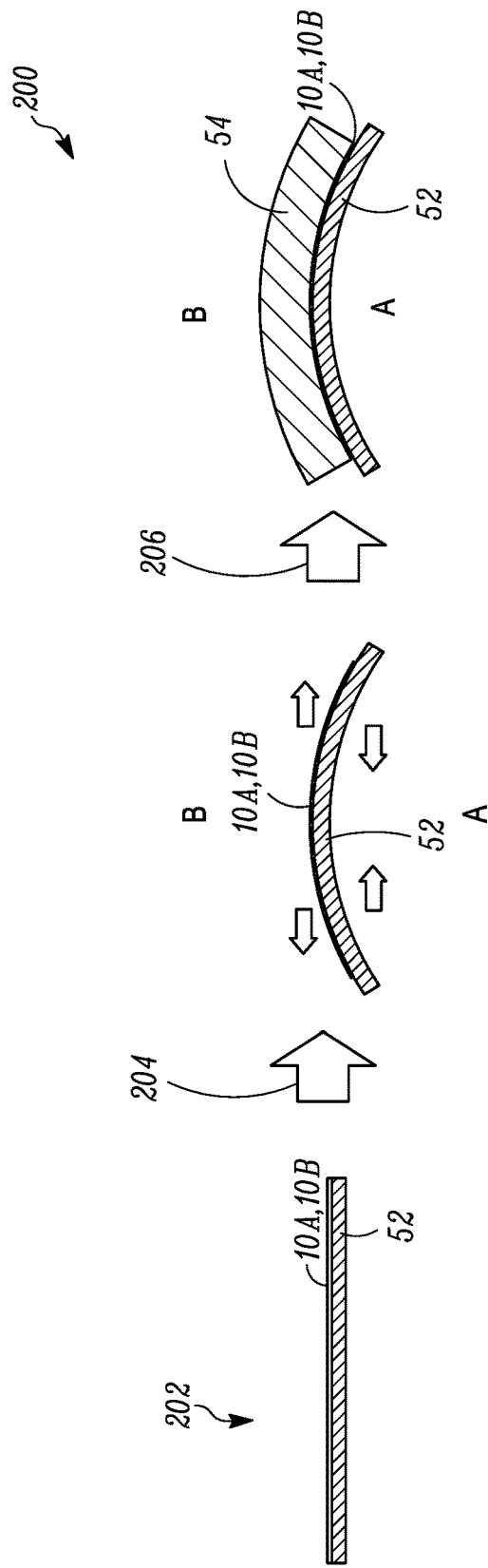
FIG. 5 illustrates a flowchart of a method for manufacturing a curved LCD, according to an embodiment.

FIG. 5 illustrates a flowchart of a method 200 for manufacturing a curved LCD (e.g., LCD 50 (FIG. 2), LCD 100A (FIG. 3A), LCD 100B (FIG. 3B), or LCD 150 (FIG. 4)), according to an embodiment.

As shown in FIG. 5, an LCD panel (e.g., LCD panel 10A (FIG. 1A), LCD panel 10B (FIG. 1B), or LCD panel 10C (FIG. 4A), referred to in the description of the method 200 as LCD panel 10 for simplicity) is secured to an auxiliary substrate (e.g., auxiliary substrate 52) at 202. The LCD panel 10 and the auxiliary substrate 52 are in a non-curved state when the LCD panel 10 and the auxiliary substrate 52 are secured together. The LCD panel 10 can be secured to the auxiliary substrate 52 by, for example, an adhesive. In an embodiment, the adhesive can be an optically clear adhesive.

At 204, the LCD panel 10 and auxiliary substrate 52 are collectively bent to form a curve (e.g., from a non-curved state to a curved state) having a concave side A and a convex side B. The LCD panel 10 and auxiliary substrate 52 are bent such that the LCD panel 10 is on the convex side B and the auxiliary substrate 52 is on the concave side A. Because of this configuration, a tensile stress can be placed on the LCD panel 10. The tensile stress can reduce a likelihood of unevenness or wrinkle formation on the LCD panel 10 when forming a curved display. Because the auxiliary substrate 52 is, for example, a toughened glass, the auxiliary substrate 52 can be formed into a curve without scratching or cracking.

At 206, the combined LCD panel 10 and auxiliary substrate 52, which are in the curved state, are secured to the cover substrate 54. The cover substrate 54 is pre-bent to a curvature that corresponds to the curvature of the combined LCD panel 10 and the auxiliary substrate 52. That is, the curvature of the cover substrate 54 is substantially similar to, subject to manufacturing tolerances or the like, the curvature of the LCD panel 10 and the auxiliary substrate 52 which are in the curved state. At 206, the arrangement of the cover substrate 54, the LCD panel 10, and the auxiliary substrate 52 is such that the auxiliary substrate 52 is disposed on the concave side A of the resulting curved LCD.

Aspects:

It is to be appreciated that any one of aspects 1-10 can be combined with any one of aspects 11-13, 14-18, and 19. Any one of 11-13 can be combined with any one of aspects 14-18 and 19. Any one of aspects 14-18 can be combined with aspect 19.

Aspect 1. A curved liquid crystal display, comprising:
a curved liquid crystal display panel, the liquid crystal display panel including:
first and second substrates, a major surface of the first substrate facing a major surface of the second substrate;
a liquid crystal layer disposed between the major surface of the first substrate and the major surface of the second substrate;

a third substrate, the third substrate being made of one of a glass or a synthetic resin, wherein the third substrate is curved in geometry;

a fourth substrate, the fourth substrate being made of glass, and being curved in geometry, wherein the liquid crystal display panel is secured to the third and fourth substrates, the liquid crystal display panel being disposed between a major surface of the third substrate and a major surface of the fourth substrate, the fourth substrate and the liquid crystal display panel being positioned on a concave side of a curve of the fourth substrate, and the third substrate being relatively thicker than the fourth substrate.

Aspect 2. The curved liquid crystal display according to aspect 1, wherein the first substrate and second substrate are made of plastic.

Aspect 3. The curved liquid crystal display according to any one of aspects 1 and 2, wherein the third substrate is relatively softer than the fourth substrate.

Aspect 4. The curved liquid crystal display according to any one of aspects 1-3, wherein the fourth substrate includes a relatively higher quantity of potassium than the third substrate.

Aspect 5. The curved liquid crystal display according to any one of aspects 1-4, wherein the fourth substrate induces a tensile stress on the liquid crystal display panel.

Aspect 6. The curved liquid crystal display according to any one of aspects 1-5, further comprising:

a conductive film, the conductive film being made of an indium-tin-oxide, the conductive film being formed on one of the third substrate and the fourth substrate.

Aspect 7. The curved liquid crystal display according to aspect 6, wherein a thin film transistor is formed on the first substrate and a color filter substrate is formed on the second substrate.

Aspect 8. The curved liquid crystal display according to aspect 7, wherein the first substrate is disposed relatively closer to the fourth substrate than the third substrate, and the conductive film is formed on a side of the third substrate facing away from the fourth substrate.

Aspect 9. The curved liquid crystal display according to aspect 7, wherein the second substrate is disposed relatively closer to the fourth substrate than the third substrate, and the conductive film is formed on a side of the fourth substrate facing away from the third substrate.

Aspect 10. The curved liquid crystal display according to any one of aspects 1-9, further comprising:

a first polarizer and a second polarizer, the first polarizer being arranged between the third substrate and one of the first and second substrates, and the second polarizer being arranged on a side of the fourth substrate facing away from the other of the first and second substrate.

Aspect 11. A curved liquid crystal display, comprising:

a curved liquid crystal display panel, the liquid crystal display panel including:

a first substrate, the first substrate being made of plastic and a plurality of thin film transistors being formed thereon;

a second substrate, the second substrate being made of glass and a plurality of color filter layers being formed thereon; and a liquid crystal layer, the liquid crystal layer being disposed between the first substrate and the second substrate;

a third substrate, the third substrate being made of one of a glass and a synthetic resin, the third substrate being curved such that a curve is formed having a convex side and a concave side, wherein the liquid crystal display panel is secured to the third substrate, the liquid crystal display panel being oriented such that the first substrate is disposed on the convex side of the third substrate.

Aspect 12. The curved liquid crystal display according to aspect 11, further comprising a conductive film made of an indium-tin-oxide, a plurality of pixel electrodes and a common electrode being formed on the first substrate, the conductive film being disposed on a side of the second substrate disposed relatively away from the third substrate.

Aspect 13. The curved liquid crystal display according to any one of aspects 11 and 12, wherein the third substrate is relatively thicker than the second substrate.

Aspect 14. A method of manufacturing a curved liquid crystal display, the method comprising:

forming a liquid crystal display panel by securing a liquid crystal layer between first and second substrates, wherein one or more of the first and second substrates are plastic;

securing the liquid crystal display panel to a third substrate being flat;

bending the liquid crystal display panel and third substrate, wherein the bending is performed such that the third substrate is disposed on a concave side of the curve;

securing the liquid crystal display panel and third substrate to a fourth substrate, the fourth substrate having a curved shape, the liquid crystal display panel being disposed between the third and fourth substrates.

Aspect 15. The method according to aspect 14, wherein bending the liquid crystal display panel and the third substrate induces a tensile stress on the liquid crystal display panel.

Aspect 16. The method according to any one of aspects 14 and 15, further comprising securing a conductive film to one of the third and fourth substrates.

Aspect 17. The method according to aspect 16, wherein securing the conductive film to one of the third and fourth substrates includes securing the conductive film to a side of the third substrate that faces away from the fourth substrate.

Aspect 18. The method according to aspect 16, wherein securing the conductive film to one of the third and fourth substrates includes securing the conductive film to a side of the fourth substrate that faces away from the third substrate.

Aspect 19. A method of manufacturing a curved liquid crystal display, the method comprising:

forming a plurality of thin film transistors on a first substrate, the first substrate being made of plastic;

forming a plurality of color filters on a second substrate, the second substrate being made of a glass;

forming a liquid crystal display panel by securing a liquid crystal layer between the first and second substrates;

bending the liquid crystal display panel, wherein the bending is performed such that the second substrate is disposed on a concave side of a curve;

providing a third substrate having a curved shape and made of glass or synthetic resin; and securing the third substrate to the liquid crystal display panel, such that the first substrate is disposed between the second and third substrates.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A curved liquid crystal display, comprising:
    a curved liquid crystal display panel, the liquid crystal display panel including:
        first and second substrates, a major surface of the first substrate facing a major surface of the second substrate;
        a liquid crystal layer disposed between the major surface of the first substrate and the major surface of the second substrate;
    a third substrate, the third substrate being made of one of a glass or a synthetic resin, wherein the third substrate is curved in geometry;
    a fourth substrate, the fourth substrate being made of glass, and being curved in geometry;
    a conductive film, the conductive film being made of an indium-tin-oxide, the conductive film being formed on one of the third substrate and the fourth substrate,
    wherein the liquid crystal display panel is secured to the third and fourth substrates, the liquid crystal display panel being disposed between a major surface of the third substrate and a major surface of the fourth substrate,
    the fourth substrate and the liquid crystal display panel being positioned on a concave side of a curve of the third substrate,
    the third substrate being relatively thicker than the fourth substrate,
    the fourth substrate includes a relatively higher quantity of potassium than the third substrate,
    a thin film transistor is formed on the first substrate and a color filter substrate is formed on the second substrate, and
    the first substrate is disposed relatively closer to the fourth substrate than the third substrate, and the conductive film is formed on a side of the third substrate facing away from the fourth substrate.

2. The curved liquid crystal display according to claim 1, wherein the first substrate and second substrate are made of plastic.

3. The curved liquid crystal display according to claim 1, wherein the third substrate is relatively softer than the fourth substrate.

4. The curved liquid crystal display according to claim 1, wherein the fourth substrate induces a tensile stress on the liquid crystal display panel.

5. The curved liquid crystal display according to claim 1, further comprising:
    a first polarizer and a second polarizer, the first polarizer being arranged between the third substrate and one of the first and second substrates, and the second polarizer being arranged on a side of the fourth substrate facing away from the other of the first and second substrate.

* * * * *